United States Patent [19]

Huang

[11] 4,397,062
[45] Aug. 9, 1983

[54] RETRACTABLE ROLLER ASSEMBLY

[76] Inventor: Jinn T. Huang, P.O. No. 360, Changhua, Taiwan

[21] Appl. No.: 231,474

[22] Filed: Feb. 3, 1981

[51] Int. Cl.³ .............................................. B60B 33/06
[52] U.S. Cl. ..................................... 16/33; 16/42 R; 190/18 A; 280/37
[58] Field of Search ................... 16/18 R, 18A, 19, 32, 16/33, 34, 42 R, 45, DIG. 34; 190/18 A; 280/37, 43.1, 43.24

[56] References Cited

U.S. PATENT DOCUMENTS

| 234,496 | 11/1880 | Simmons | 16/34 |
|---|---|---|---|
| 2,596,578 | 5/1952 | McIntyre et al. | 16/18 R X |
| 3,716,890 | 2/1973 | Benson | 16/34 X |
| 4,097,955 | 7/1978 | Foge et al. | 190/18 A X |

FOREIGN PATENT DOCUMENTS

| 2291877 | 6/1976 | France | 16/19 |
|---|---|---|---|
| 55-123504 | 9/1980 | Japan | 16/19 |
| 2026070 | 1/1980 | United Kingdom | 16/34 |

Primary Examiner—Fred Silverberg
Attorney, Agent, or Firm—Cushman, Darby & Cushman

[57] ABSTRACT

A rotatable roller assembly includes a roller, a housing, a support pivotably connected at one end to the housing for pivotal movement between a first retracted position and a second extended position, the roller being rotatably connected to the other end of the support, first and second notches defined in the support for establishing the first and second positions, respectively, and a locking mechanism slideably movable into and out of locking engagement with the first and second notches to effect releasable locking of the support and thus the roller in the first and second positions, respectively.

10 Claims, 13 Drawing Figures

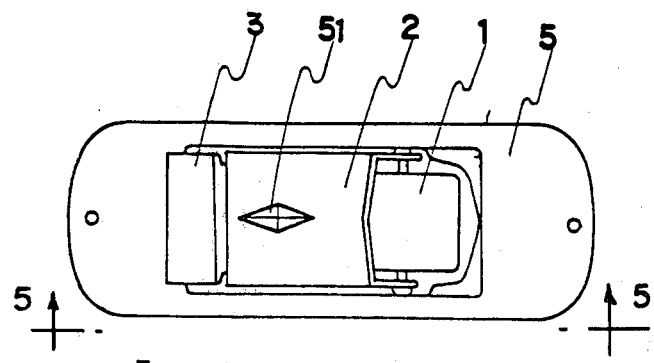
FIG. 4
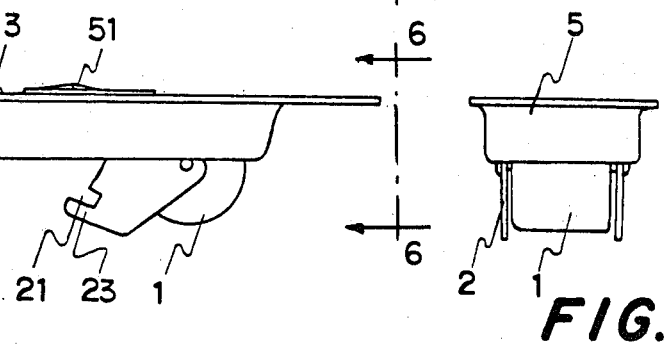
FIG. 5
FIG. 6
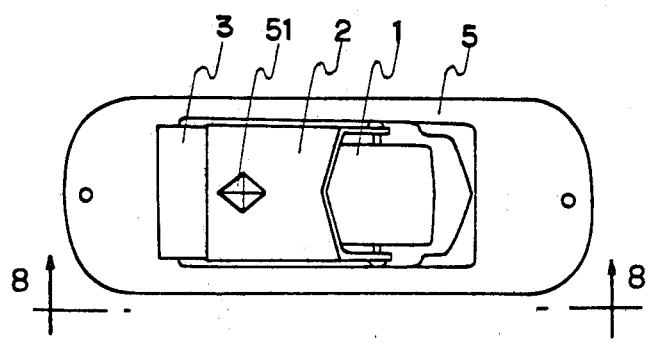
FIG. 7
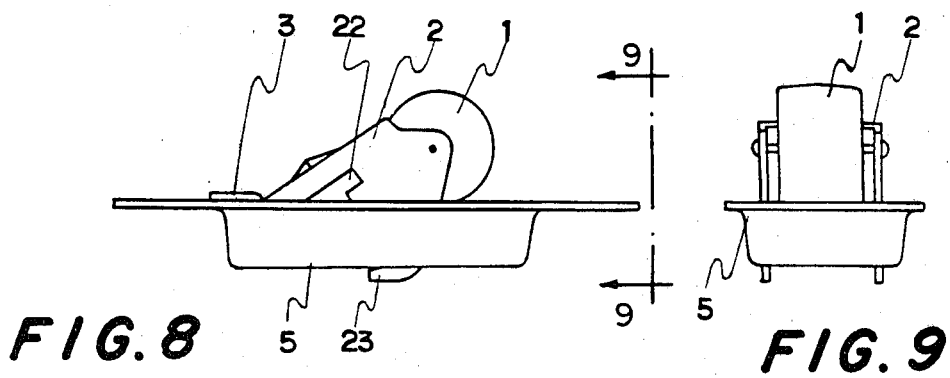
FIG. 8
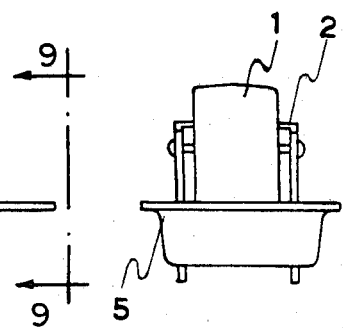
FIG. 9

RETRACTABLE ROLLER ASSEMBLY

BACKGROUND AND SUMMARY OF THE PRESENT INVENTION

The present invention relates to a retractable roller or wheel assembly wherein an upper notched portion and a lower notched portion defined by the pivotal roller support can be selectively engaged by a stop member so as to permit the roller to be withdrawn and thus hidden in the roller housing when desired or to be pivotably moved out of its hidden relationship with the housing and locked into an operable position. Using the roller assembly of the present invention is very simple. The stop member, if outwardly moved, is separable from an engaging relationship with the upper notch and thus, the roller can be pressed into the roller housing until the lower notch is in alignment with the stop member. Thus, upon release of the stop member, engagement with the lower notch will be effected so as to retain the roller in its withdrawn and hidden position within the roller housing. If the stop member is outwardly moved once again (e.g. so as to disengage the stop member and the lower notch), the roller will be pivotably biased out of the roller housing due to a biasing spring force so as to be extended into an operable rolling position.

The conventional rollers which are installed on the bottom of suitcases are normally fixed and thus are not pivotably movable. Manually carrying an empty middle-size suitcase can be inconvenient and ungraceful due to the conventional exposed rollers. Moreover, exposed rollers may waste packing space thereby resulting in a loose arrangement of packed articles. This, of course, presents problems for both manufacturers and consumers. Furthermore, it is difficult for consumers to make a choice between middle- and small-size suitcases of the type either equipped with rollers or not.

This invention is designed to eliminate the above drawbacks of conventional roller assemblies and is characterized by permitting the rollers to be pivotably and lockably movable from the inside to the outside of the roller housing as desired by the user. Thus, valuable packing space is saved utilizing the assembly of the present invention.

The main object of the present invention therefor is to provide an easily- and conveniently-operable roller assembly for suitcases by actuating the stop member one can press the roller into its housing or permit it to spring out therefrom.

Another object of the present invention is to provide a structure whereby the roller can be releasably lockable utillizing the stop member so as to lock the upper and lower notches, respectively, into operable and hidden positions. According to the present invention therefor the parts and locking action thereof are very simple.

Still another object of this invention is to provide a roller assembly which saves packing space and is easy to use. If mounted on the middle- and small-size suitcases, this invention can be pressed into or out of the roller housing as required by the user so that these suitcases can also be used as travel cases. In the situation wherein the user desires to pack the suitcase for shipment, merely pressing the roller into its roller housing will save the packing space thereby greatly facilitating the packing chore.

This invention is particularly characterized by simple structures, sturdiness and durability, easy operation, inexpensive cost and ease of installing the roller assembly onto or removing same from the suitcase. Therefore, this invention is really creative and wonderful.

BRIEF DESCRIPTION OF THE ACCOMPANYING DRAWINGS

Reference will be hereinafter made to the accompanying drawings wherein like numerals throughout the various figures denote like structural elements and wherein:

FIG. 4 is a top plan view of the roller assembly of the present invention in a retracted position;

FIG. 5 is a side elevational view of the present invention taken along line 5—5 in FIG. 4;

FIG. 6 is an end elevational view of the present invention taken along line 6—6 in FIG. 5;

FIG. 7 is a top plan view of the roller assembly of the present invention in an extended position;

FIG. 8 is a side elevational view of the present invention taken along line 8—8 in FIG. 7; and FIG. 9 is an end elevational view taken along line 9—9 in FIG. 8.

DETAILED DESCRIPTION OF THE PREFERRED EXEMPLARY EMBODIMENT

The present invention can be best described hereinafter by reference to the accompanying drawings.

Figure 1:
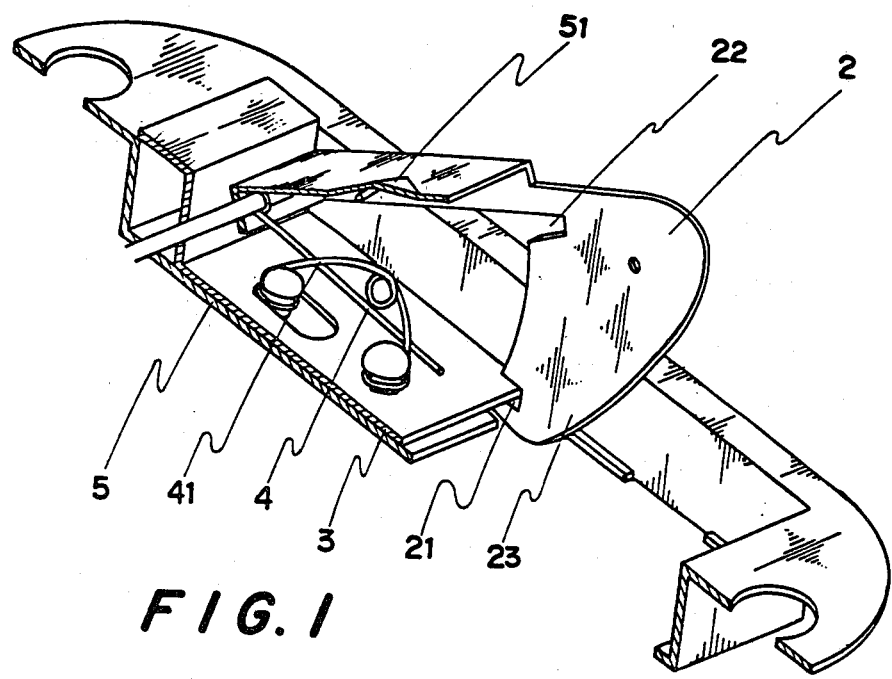
FIG. 1 is a perspective cross-section view of the present invention.

As shown in FIG. 1, the present invention generally includes such main elements as a roller 1, a roller support 2, an upper notch 21 and a lower notch 22, a stop member 3, a spring 4 and a spring 41, and a roller housing 5. The stop member 3 can move into and out of locking engagement with each of the notches 21, 22 when the latter are brought into alignment with the former due to the pivotal mounting of support 2 to housing 5. The biasing force of spring 41 biases stop member 3 into locking engagement with notches 21, 22. Thus, if stop member 3 is outwardly moved, it separates from the upper notch 21, for example, defined by the roller support 2 so as to permit the roller 1 and roller support 2 to be pivotably pressed into the roller 5. Conversely, if stop member 3 is released, spring 41 biases it into locking engagement with the lower notch 22 so as to lock the roller 1 and roller support 2 within the roller housing 5 (e.g. in a retracted position).

Figure 2:
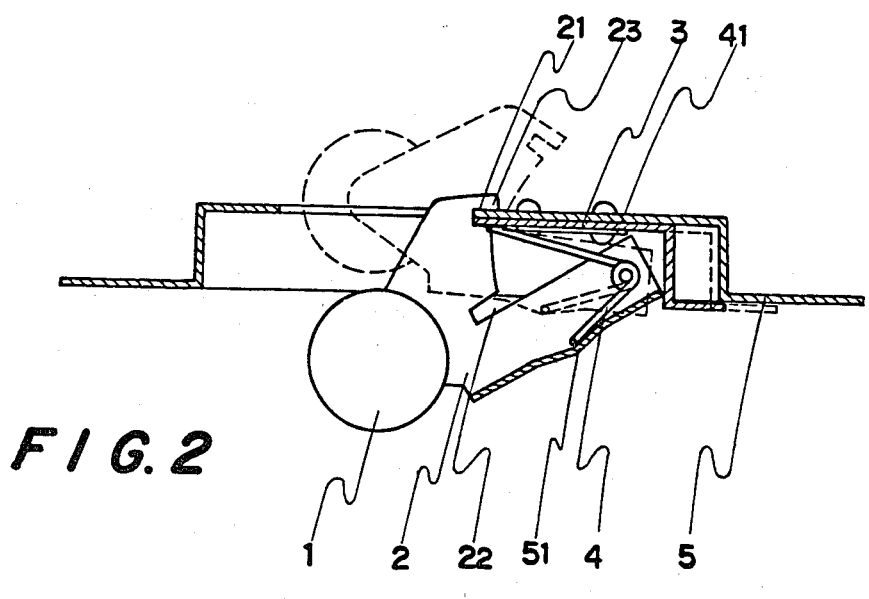
FIG. 2 is a cross-sectional elevational view of the present invention.
Figure 3A:
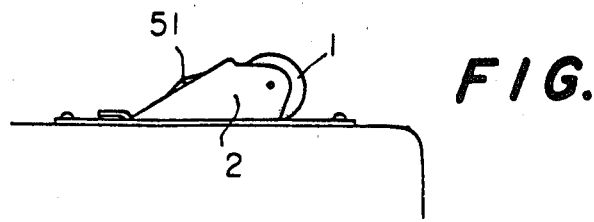
FIGS. 3a–3e depict a consecutive action view of the operation of the present invention.
Figure 3B:
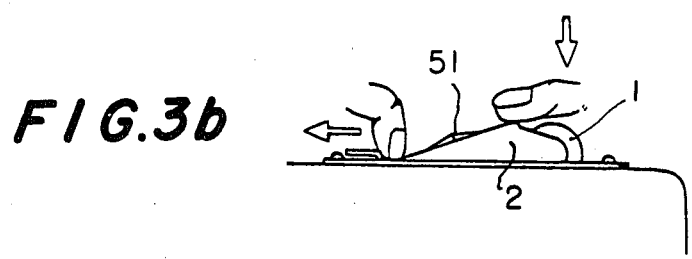
Figure 3C:
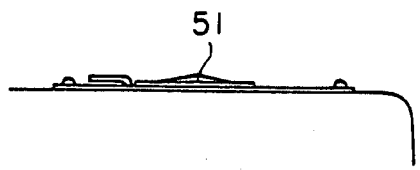
Figure 3D:
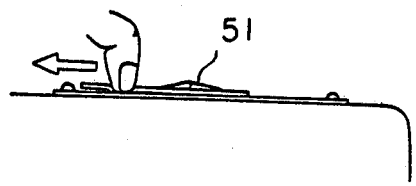
Figure 3E:
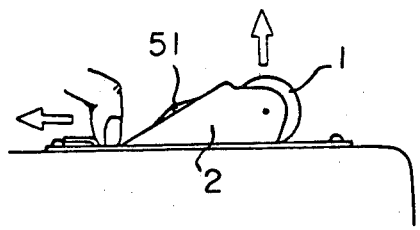

As shown in FIG. 2, the roller 1 is rotatably mounted on roller support 2. The stop member 3, if moved outwardly separates from the upper notch 21 thus permitting the roller 1 to be manually pressed into the roller housing 5 until lower notch 22 is registrable with stop member 3. Thereafter, roller 1 can be locked in a retracted position within roller housing 5 by merely releasing stop member 3 thereby permitting the biasing force of spring 41 to bias member 3 into locking engagement with lower notch 22. When it is desired to extend roller 1 from its retracted position within housing 5, all that is necessary is to once again move stop member 3 outwardly so as to separate it from the lower notch 22 to permit roller support 2 and thus roller 1 to be extended due to the biasing force of spring 4 until catch 23 above upper notch 21 contacts a portion of housing 5 thereby limiting the extent of pivotal movement thereof. The biasing force of spring 41 ensures that stop member 3 holds the upper notch 21 upon release of the latter so as to securely lock roller 1 in its extended position outside the roller housing 5.

As shown in FIGS. 3a-3e, it is readily apparent that the operation of this invention is very easy. When the roller 1 is manually pressed into the roller housing 5, a rhombic corner cushion 51 can then be used as the base cushion for the bottom of the suitcase.

I claim:

1. A retractable roller assembly comprising in combination:

a roller;

a housing for said roller;

roller support means having one end pivotably connected to said housing and means mounting said roller for rotatable movement to the other end of said roller support means, said roller support means being pivotable between a first retracted position wherein said roller is housed within said housing and a second extended position wherein said roller is extended at least partially beyond said housing for rolling engagement with a surface;

first means defining a first notch in said support means for establishing said first position;

second means vertically separated from said first means defining a second notch in said support means and for establishing said second position; and locking means slideably mounted to said housing for reciprocal rectilinear sliding movement into and out of locking engagement with said first and second notches, said locking means for (a) releasably locking said support means in said first position by being slideably moved into engagement with said first notch when said first notch is moved into registry with said locking means by virtue of the pivotal movement of said support means, (b) releasably locking said support means in said second position by being slideably moved into engagement with said second notch when said second notch is moved into registry with said locking means by virtue of said pivotal movement of said support means, and (c) permitting said support means to be freely pivotable between said first and second positions by being slideably moved out of said locking engagement with either of said first or second notches.

2. An assembly as in claim 1 further comprising first biasing means for biasing said locking means in a notch-engaging direction.

3. An assembly as in claim 2 further comprising second biasing means for biasing said support means in a direction encouraging said support means to be pivotably moved to said second extended position.

4. An assembly as in claim 3 wherein said housing includes first and second pairs of opposing side walls and a partial bottom wall fixed to said first pair of said side walls and one wall of said second pair of side walls, said bottom wall together with another wall of said second pair of side walls defining an interior space into which a portion of said roller is receivable when in said first retracted position.

5. An assembly as in claim 4 wherein said locking means is mounted to said bottom wall for reciprocal sliding movement relative thereto.

6. An assembly as in claim 1 wherein said support means includes means defining raised surfaces for cushioning said assembly when said roller is in said first retracted position.

7. In combination with a piece of luggage, a roller assembly as in claim 1.

8. A retractable roller assembly comprising in combination:

a roller;

a housing for said roller including a substantially planar bottom wall, said bottom wall including means defining an open space;

support means supporting said roller for pivotal movement at one end and having the other end pivotably connected to said housing for permitting pivotal movement of said support means between a first retracted position wherein said roller is housed within said housing and at least partially extends through said open space, and a second extended position wherein said roller is extended at least partially beyond said housing for rolling engagement with a surface, said support means further including means defining first and second notches establishing said first and second positions, respectively;

locking means mounted to said bottom wall for rectilinear sliding reciprocal movement relative thereto and for (a) releasably locking said support means in said first position by being slideably moved into engagement with said first notch when said first notch is moved into registry with said locking means by virtue of said support means being pivotably moved to said first position, (b) releasably locking said support means in said second position by being slideably moved into engagement with said second notch when said second notch is moved into registry with said locking means by virtue of said support means being pivotably moved to said second position, and (c) permitting said support means to be freely pivotable between said first and second positions by being slideably moved out of said locking engagement with either of said first or second notches;

first biasing means for biasing said locking means in a direction encouraging locking engagement with either of said first or second notches; and second biasing means for biasing said support member in a direction encouraging pivotal movement thereof to said second position.

9. An assembly as in claim 8 wherein said support means further includes means defining raised surfaces for cushioning said assembly when said roller is in said first retracted position.

10. In combination with a piece of luggage, a roller assembly as in claim 8.

* * * * *